United States Patent
Ramésh et al.

[11] Patent Number: 6,085,103
[45] Date of Patent: Jul. 4, 2000

[54] COMPENSATING FOR FADING IN ANALOG AM RADIO SIGNALS

[75] Inventors: Rajaram Ramésh, Ware; Sandeep Chennakeshu, Cary, both of N.C.

[73] Assignee: Ericsson, Inc., Research Triangle, N.C.

[21] Appl. No.: 08/802,670

[22] Filed: Feb. 19, 1997

[51] Int. Cl.[7] .................................................. H04B 15/00
[52] U.S. Cl. ..................... 455/504; 455/501; 455/506; 375/346
[58] Field of Search ................................. 455/504, 506, 455/73, 108, 109, 114, 204, 296; 345/345, 267, 268, 285, 346, 340; 370/477, 468

[56] References Cited

U.S. PATENT DOCUMENTS

| | | | |
|---|---|---|---|
| 4,821,097 | 4/1989 | Robbins | 348/485 |
| 4,899,367 | 2/1990 | Sampei | 375/39 |
| 5,222,250 | 6/1993 | Cleveland et al. | 455/47 |
| 5,319,801 | 6/1994 | Richey et al. | 455/79 |
| 5,414,734 | 5/1995 | Marchetto et al. | 375/267 |
| 5,428,610 | 6/1995 | Davis | 370/312 |
| 5,596,608 | 1/1997 | Sassa et al. | 375/346 |
| 5,633,891 | 5/1997 | Rebec et al. | 375/219 |
| 5,712,877 | 1/1998 | Ho et al. | 375/384 |
| 5,809,083 | 9/1998 | Wright | 375/285 |
| 5,901,185 | 5/1999 | Hassan | 375/346 |
| 5,912,931 | 6/1999 | Matsumoto et al. | 375/340 |

FOREIGN PATENT DOCUMENTS

| | | |
|---|---|---|
| 0 605 955 A2 | 7/1994 | European Pat. Off. . |
| 0 674 451 A2 | 9/1995 | European Pat. Off. . |
| PCT/US98/02936 | 5/1998 | WIPO . |

OTHER PUBLICATIONS

*An Analysis of Pilot Symbol Assisted Modulation for Rayleigh Fading Channels* by James K. Cavers, Member, IEEE, vol. 40, No. 4, Nov. 1991.

Primary Examiner—Dwayne D. Bost
Assistant Examiner—Sonny Trinh
Attorney, Agent, or Firm—Jenkens & Gilchrist, A Professional Corporation

[57] ABSTRACT

A fading compensation apparatus and method are provided in which blocks of the analog AM signal (e.g., voice) are time-compressed at a transmitter. Gaps in the time-compressed signal are filled with pilot symbols (or similar complex waveforms) having known characteristics, such as predetermined amplitudes. The time-compressed analog AM signal (e.g., SSB or VSB) is transmitted over the fading channel. At an analog AM receiver, an estimate of the fading that occurred in the transmission channel is made by observing the amplitude of the received pilot symbols at discrete points in time, and interpolating to determine the amount of fading that occurred across the total transmitted signal. A fading compensator compares the received faded time-compressed signal with the interpolation results, and adjusts the amplitude and phase of the received signal accordingly to compensate for the fading that occurred in the transmission channel. The compensated analog AM signal is time expanded and output to a user.

23 Claims, 1 Drawing Sheet

COMPENSATING FOR FADING IN ANALOG AM RADIO SIGNALS

BACKGROUND OF THE INVENTION

1. Technical Field of the Invention

The present invention relates generally to the field of radio communications, and more particularly, to an apparatus and method that compensates for fading in analog amplitude modulated (AM) radio signals.

2. Description of Related Art

A major problem encountered in transmitting radio signals to mobile receivers (or from mobile transmitters) is known as "fading." Fading in a transmitted radio signal can occur in two ways: (1) the transmitted signal is absorbed or blocked by obstacles (e.g., buildings, metal towers, etc.) located between the radio transmitter and receiver, or (2) the transmitted signal is reflected and scattered off numerous obstacles located along the transmission path. The absorbing or blocking type of fading is known as "shadowing" or "log normal" fading. The reflecting or scattering type is known as "multipath" or "Rayleigh" fading.

In Rayleigh fading, the reflected signals take different paths to the receiver and thus arrive out of phase. This means that the received signal is the sum of the reflected signals, which differ in phase (and to some extent in amplitude). These different-phase signals are added as vectors, so at certain times, the vector sum of the signals can be near zero. Consequently, the strength of the received signal at that time is also near zero.

Analog signals are transmitted over radio channels using AM or frequency modulation (FM). For example, analog voice signals are transmitted using AM in mobile telephone systems, such as the Airphone (air-to-ground mobile telephone) System produced by GTE. Commercial and amateur fixed radio broadcast systems also transmit analog voice signals using AM. These AM analog voice transmissions can include conventional AM, single sideband (SSB), double sideband (DSB), or vestigial sideband (VSB) transmissions.

FM is typically used for many cellular mobile transmissions. An advantage of using FM over AM for cellular transmissions is that FM is far less sensitive to fading than AM, because the voice information being carried is encoded as phase changes in the FM transmission, but the modulation envelope remains constant. Since no information is present in the amplitude of the signal, the information can be reconstructed even if the fading causes a loss in amplitude information.

On the other hand, an advantage of using AM over FM is that AM transmissions occupy a smaller portion of the frequency spectrum than FM transmissions. However, SSB and VSB AM transmissions are highly sensitive to fading, because the voice information is being carried in both the phase and amplitude of the transmitted AM signal.

Different methods have been used to render SSB and VSB AM signals less sensitive to Rayleigh fading. One such method inserts a "pilot tone" having a predetermined magnitude into the transmitted AM carrier signal. At the AM receiver, the magnitude and phase of the received pilot tone is detected and used to estimate and compensate for the effects of the fading channel. However, pilot tones cause relatively high carrier signal fluctuations and expand signal bandwidth requirements.

Pilot symbols (as opposed to tones) inserted in digital signal transmissions are being used to compensate for Rayleigh fading. One technique used to insert pilot symbols in digital signal transmissions to compensate for Rayleigh fading has been disclosed in U.S. Pat. No. 5,414,734 to Marchetto et al ("Marchetto"). Marchetto discloses the use of pilot symbols, which are appended to a plurality of data symbols to form successive frames that are modulated at a transmitter. The received frames are processed to produce a data signal and pilot signal. The data signal is composed of the data symbols, and the pilot signal is composed of the pilot symbols. Channel impulse response estimates are made of successive blocks of the pilot symbols. These estimates are interpolated and applied to successive data symbols in the (delayed) data signal, which enables the receiver to decode the data and compensate for the effects of fading. However, Marchetto's use of pilot symbols for fading compensation is disclosed for digital signals only and not for analog signals.

SUMMARY OF THE INVENTION

Accordingly, a need exists in the mobile radiotelephone industry for a technique that can be used to compensate for fading of an analog AM signal. In accordance with the present invention, a fading compensation apparatus and method are provided in which blocks of the analog AM signal (e.g., voice) are time-compressed at a transmitter. Gaps in the time-compressed signal are filled with pilot symbols (or similar complex waveforms) having known characteristics, such as predetermined amplitudes and phases. The time-compressed analog AM signal (e.g., SSB or VSB) is transmitted over the fading channel. At an analog AM receiver, an estimate of the fading that occurred in the transmission channel is made by observing the amplitude of the received pilot symbols at discrete points in time, and interpolating to determine the amount of fading that occurred across the total transmitted signal. A fading compensator compares the received faded time-compressed signal with the interpolation results, and adjusts the amplitude and phase of the received signal accordingly to compensate for the fading that occurred in the transmission channel. The compensated analog AM signal is time expanded and output to a user.

An important technical advantage of the present invention is that the use of pilot symbols over pilot tones to compensate for fading in an analog AM signal is that pilot symbols lead to significantly lower transmitted signal envelope fluctuations and require less transmission bandwidth than pilot tones.

Another important technical advantage of the present invention is that the quality of the perceived analog AM voice signals at the receiver are significantly improved over those received signals that are not fading compensated using pilot symbols.

Yet another important technical advantage of the present invention is that the use of pilot symbols for fading compensation of analog AM signals instead of pilot tones allows the use of signal encryption schemes that require a common time base between the transmitter and receiver used.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE PREFERRED EMBODIMENT

Figure 1:
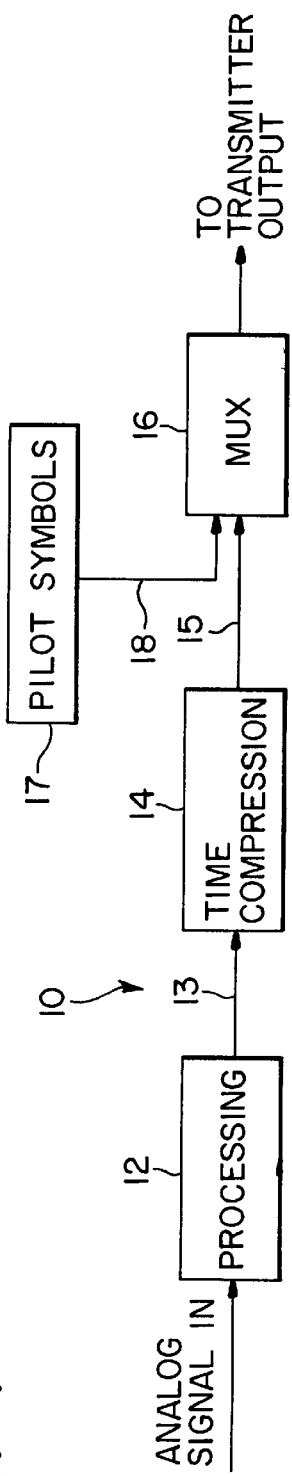
FIG. 1 is a schematic block diagram of an analog AM transmitter that uses pilot symbols to compensate for fading, in accordance with a preferred embodiment of the present invention.
Figure 2:
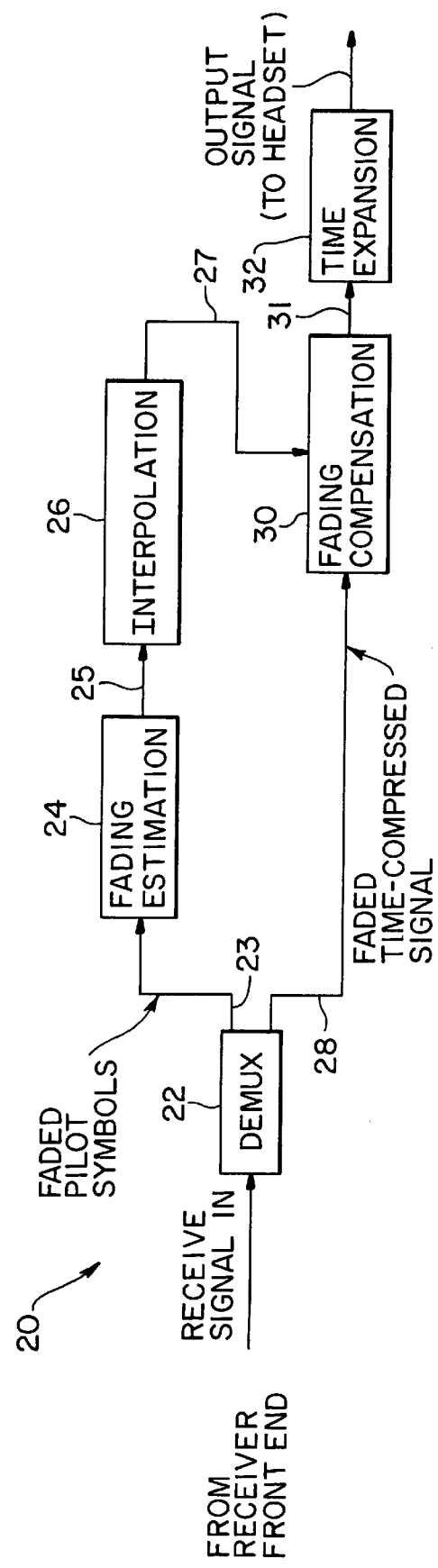
FIG. 2 is a schematic block diagram of an analog AM receiver that uses pilot symbols to compensate for fading, in accordance with the preferred embodiment of the present invention.

The preferred embodiment of the present invention and its advantages are best understood by referring to FIGS. 1–2 of the drawings, like numerals being used for like and corresponding parts of the various drawings.

FIG. 1 is a schematic block diagram of an analog AM transmitter that uses pilot symbols to compensate for fading, in accordance with a preferred embodiment of the present invention. Referring to FIG. 1, an analog AM transmitter 10 is shown. For this illustrative embodiment, transmitter 10 includes a signal processor unit 12, which processes an incoming analog signal, such as, for example, analog voice signals from a microphone (not explicitly shown) and produces a SSB or VSB signal. However, the basic concept of the present invention is not intended to be so limited, and it can include fading compensation using pilot symbols for standard analog AM or DSB radio signals, for example, or the analog AM (video) portion of a television transmission. The output of signal processor 12 is connected by line 13 (e.g., coaxial transmission cable) to an input of a time compression unit 14, which time-compresses the processed analog signal. Consequently, gaps in time are created between successive blocks of the time-compressed analog signal. The signal is time-compressed primarily to allow room for the introduction of pilot symbols.

The output of time compression unit 14 is connected by line 15 (e.g., coaxial cable) to an input of a signal multiplexer 16. An output of a pilot symbol generator 17 is connected by line 18 (e.g., coaxial cable) to a second input of signal multiplexer 16, which multiplexes the blocks of time-compressed signals with one or more of a plurality of input pilot symbols (or complex waveforms that perform a similar function). The pilot symbols are thereby inserted into the analog signals to be transmitted. An output of signal multiplexer 16 is connected by a conventional transmission line to a conventional output power section (not explicitly shown) of analog AM transmitter 10. The multiplexed analog SSB or VSB signals containing pilot symbols are then transmitted from a conventional antenna.

In an exemplary application, instead of coupling the time-compressed signal from time compression unit 14 directly to an input of signal multiplexer 16, the time-compressed signal can be sampled, processed, and filtered to produce an analog signal that can then be coupled to the input of signal multiplexer 16 and transmitted along with the pilot symbols. These signal samples can be arranged, for example, as a form of signal encryption.

FIG. 2 is a schematic block diagram of an analog AM receiver that uses pilot symbols to compensate for fading, in accordance with the preferred embodiment of the present invention. Referring to FIG. 2, an analog AM receiver 20 is shown. For this illustrative embodiment, receiver section 20 includes a demultiplexer 22, which demultiplexes the received analog SSB or VSB signals from the receiver front end portion (not explicitly shown), and thereby separates the received signals into one or more of a plurality of pilot symbols at one output, and a time-compressed analog signal at a second output. The pilot symbol(s) output from demultiplexer 22 is coupled by transmission line 23 (e.g., coaxial cable) to an input of a fading estimation unit 24. The analog signal(s) output from demultiplexer unit 22 is coupled by a transmission line 28 to an input of a fading compensation unit 30. The output of fading estimation unit 30 is connected by a transmission line 25 to an input of an interpolation unit 26. The output of interpolation unit 26 is connected by a transmission line 27 to a second input of fading compensation unit 28. The output of fading compensation unit 28 is coupled to an input of a time expansion unit 30. The output of time expansion unit 30 is connected to the output section (not explicitly shown) of receiver 20.

In operation, the input analog signal (typically speech) to transmitter 20 is processed to produce an analog SSB or VSB signal. The SSB or VSB signal is preferably time-compressed, which creates successive blocks of signals. Pilot symbols from pilot symbol generator 18 are inserted into the analog signal blocks at multiplexer 16, thereby multiplexing the time-compressed signals and the pilot symbols. The resulting time-compressed SSB or VSB analog signal blocks containing pilot symbols (or complex waveforms that perform an equivalent function) are then transmitted.

Upon receiving the multiplexed time-compressed SSB or VSB analog signals, demultiplexer 22 extracts the pilot symbols (or equivalent waveforms) by demultiplexing the received analog signals. Fading estimation unit 24 analyzes the extracted pilot symbols for fading at discrete points in time. Interpolation unit 26 interpolates between the discrete values by calculating an estimate of the fading that occurred for all time. This interpolation can be accomplished because the fading process has a relatively low bandwidth. Nevertheless, the rate of occurrence of the analyzed fading should be greater than twice the maximum frequency of the fading that occurred.

Notably, to improve the fading estimate, the amplitude of the inserted pilot symbols should be at the maximum possible amplitude level allowed for the received analog signal. Comparing the interpolated estimate of the fading that occurred with the faded time-compressed signal, the fading compensation unit 30 adjusts the amplitude and phase of the received signal accordingly to compensate for the fading that occurred. The time-compressed, fading compensated signal is then expanded in time and output to a user.

In order for the above-described fading compensation apparatus to work efficiently, the transmitter and receiver operations should be synchronized so that the receiver knows at what point in time each pilot symbol was inserted into the analog signal. The pilot symbols (or complex waveforms) may be used to fine tune this synchronization.

A primary advantage of using pilot symbols to compensate for fading in an analog AM voice transmission is that the quality of the perceived voice information is significantly improved over prior techniques. Also, since the transmitter and receiver are synchronized, certain encryption schemes may be used for the analog signal, which rely on the transmitter and receiver having a common time base. Consequently, the present invention permits the use of rolling-key based encryption schemes, which are not possible to use with systems that utilize pilot tones for fading compensation.

An example of such a rolling-key based encryption scheme is a so-called "RSA Algorithm", which can be used to create public key/private key pairs for use in encrypting transmitted messages. By knowing the private key in the pair, any message encrypted with the public key can be decrypted. Alternatively, instead of using the RSA Algorithm to create a public/private key pair, a so-called Diffie- Hellman "exponential key exchange" algorithm can be used to let the transmitter and receiver agree on a secret session key, which is used to encrypt the transmitted messages. Since the use of pilot symbols permits synchronization of the transmitter and receiver operations, these types of encryption schemes can be effectively used.

Although a preferred embodiment of the method and apparatus of the present invention has been illustrated in the accompanying drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for use in compensating for fading of an analog AM signal, comprising:
   an analog AM transmitter, said transmitter including:
      a pilot symbol generator;
      a signal time compressor; and
      a signal multiplexer, an output of said pilot symbol generator and said signal time compressor coupled to a respective input of said signal multiplexer; and
   an analog AM receiver, said receiver including:
      a signal demultiplexer;
      a fading estimation apparatus;
      an interpolation apparatus; and
      a fading compensation apparatus, an output of said fading estimation apparatus coupled to an input of said interpolation apparatus, a first output of said signal demultiplexer coupled to an input of said fading estimation apparatus, a second output of said signal demultiplexer coupled to a first input of said fading compensation apparatus, and an output of said interpolation apparatus coupled to a second input of said fading compensation apparatus.

2. The system according to claim 1, wherein said analog AM transmitter further includes a signal processor for converting an input analog signal to an analog AM signal, an output of said signal processor coupled to an input of said signal time compressor.

3. The system according to claim 1, wherein said input analog signal comprises a voice signal.

4. The system according to claim 2, wherein said analog AM signal comprises an SSB signal.

5. The system according to claim 2, wherein said analog AM signal comprises a VSB signal.

6. The system according to claim 1, wherein said analog AM receiver further includes a signal time expansion apparatus, an output of said fading compensation apparatus coupled to an input of said signal time expansion apparatus.

7. The system according to claim 1, wherein said pilot symbol generator is operable to generate a plurality of complex waveforms.

8. The system according to claim 1, wherein said analog AM signal comprises an encrypted signal.

9. The system according to claim 8, wherein said encrypted signal is based on a rolling-key type of encryption scheme.

10. The system according to claim 8, wherein said encrypted signal is derived from an RSA algorithm.

11. The system according to claim 8, wherein said encrypted signal is derived from a Diffie-Hellman exponential key exchange algorithm.

12. An analog AM signal receiver for use in fading compensation, comprising:
   a signal demultiplexer;
   a fading estimation apparatus;
   an interpolation apparatus; and
   a fading compensation apparatus, an output of said fading estimation apparatus coupled to an input of said interpolation apparatus, a first output of said signal demultiplexer coupled to an input of said fading estimation apparatus, a second output of said signal demultiplexer coupled to a first input of said fading compensation apparatus, and an output of said interpolation apparatus coupled to a second input of said fading compensation apparatus.

13. The analog AM signal receiver according to claim 12, further comprising a signal time expansion apparatus, an output of said fading compensation apparatus coupled to an input of said signal time expansion apparatus.

14. The analog AM signal receiver according to claim 12, wherein said signal demultiplexer is operable to separate a received analog AM input signal into a first signal comprising a plurality of faded pilot symbols and a second signal comprising a plurality of faded analog AM input signals, said first signal coupled to said fading estimation apparatus and said second signal coupled to said fading compensation apparatus.

15. A method for compensating for fading of an analog AM signal, comprising the steps of:
   time compressing said analog AM signal;
   multiplexing a plurality of pilot symbols with said time compressed analog AM signal to form a composite signal, and transmitting said composite signal;
   receiving said transmitted composite signal;
   separating said received signal into a first faded signal comprising said plurality of pilot symbols, and a second faded signal comprising said time compressed analog AM signal; and
   compensating for fading using said first faded signal and said second faded signal to form a fading compensated signal.

16. The method according to claim 15, said compensating step further comprising the steps of:
   estimating the fading of said analog AM signal using said first faded signal;
   interpolating said estimating of said fading; and
   varying an amplitude and phase of said second faded signal in response to a result of said interpolating step.

17. The method according to claim 15, further comprising the step of time expanding said fading compensated signal.

18. The method according to claim 15, wherein said analog AM signal comprises a voice signal.

19. The method according to claim 15, wherein said analog AM signal comprises an SSB signal.

20. The method according to claim 15, wherein said analog AM signal comprises a VSB signal.

21. The method according to claim 15, wherein said analog AM signal comprises an encrypted signal.

22. A method for compensating for fading of an analog AM signal, comprising the steps of:
   sampling the analog AM signal to produce a plurality of signal samples;
   processing said plurality of signal samples to produce a plurality of processed signal samples;
   filtering said plurality of processed signal samples to produce a filtered signal;
   compressing portions of said filtered signal in a signal time compressor to produce a time compressed signal;

multiplexing a plurality of pilot symbols with said time compressed signal to form a composite signal, and transmitting said composite signal;

receiving said transmitted composite signal;

separating said received composite signal into a first faded signal comprising said plurality of pilot symbols, and a second faded signal comprising said filtered signal; and compensating for fading using said first faded signal and said second faded signal to form a fading compensated signal.

23. The method according to claim 22, wherein said plurality of signal samples comprise an encrypted signal.

* * * * *